United States Patent [19]

Miller

[11] 4,047,155
[45] Sept. 6, 1977

[54] UNIVERSAL DATA RECORDING SYSTEM

[76] Inventor: Arthur O. Miller, 10141 Chesterton Drive, Dallas, Tex. 75238

[21] Appl. No.: 742,091

[22] Filed: Nov. 16, 1976

Related U.S. Application Data

[63] Continuation of Ser. No. 531,549, Dec. 11, 1974, abandoned.

[51] Int. Cl.$^2$ .................................................. H04Q 5/00
[52] U.S. Cl. .......................... 340/147 R; 340/152 R; 340/163; 340/408; 340/151
[58] Field of Search ............... 340/147 R, 152 R, 163, 340/408, 151

[56] References Cited

U.S. PATENT DOCUMENTS

| 3,435,416 | 3/1969 | Kretsch | 340/163 |
| 3,593,293 | 7/1971 | Rorholt | 340/152 |

*Primary Examiner*—Harold I. Pitts
*Attorney, Agent, or Firm*—Richards, Harris & Medlock

[57] ABSTRACT

Changes in the electrical state of devices connected to a plurality of wiring terminals are detected and recorded by a data recording system programmed to evaluate the terminals singularly or in groups of various combinations. A central controller is programmed to generate terminal address data, either singularly or in groups of various combinations, and these terminal addresses are applied to a cable driver that partially decodes the address data into one of several selected terminal groups. The partially decoded terminal address data is applied to decoder/selectors for each of several major terminal groups wherein further decoding takes place. Only one of the detector/selectors is activated by the partially decoded address data to further decode the address to identify a particular terminal or group of terminals. The decoded data provides a control signal that actuates terminal gates for the selected terminals to couple a voltage at the terminals to a detector/control. The detector/control converts the voltage at the selected terminals into an electrical state code that is applied through the cable driver to the central controller. Coupled to the central controller is a recorder or other readout device for producing a hard copy display presenting the electrical state of the selected terminals.

14 Claims, 5 Drawing Figures

UNIVERSAL DATA RECORDING SYSTEM

REFERENCE TO RELATED APPLICATION

This is a continuation of application Serial No. 531,549, filed December 11, 1974, now abandoned.

BACKGROUND OF THE INVENTION

This invention relates to a data recording system, and more particularly to a recording system having flexibility to respond to the electrical state of devices connected to any one of a plurality of terminals either singularly or in groups of various combinations.

With the increase in size and complexity of modern large industrial establishments it is becoming evermore essential to provide administrative, engineering, maintenance and statistical information regarding the electrical state of various devices functioning in the system. Typically, the electrical devices may be detectors responsive to the opened and closed position of valves in a complex piping system of a chemical processing plant. Such electrical devices may also respond to the amount of telephone service used by a customer or group of customers, that is, the precise time of each telephone usage, whether the call was incoming or outgoing, as well as various other statistical information regarding telephone service. In yet another example showing the complete flexibility of the present invention is the monitoring of electrical devices associated with parking spaces in a group of parking lots to monitor when such space is filled, how long each space was filled and the time when each space is vacated. Changes in the electrical state of the devices in each of the above examples may be translated into a recording of events, measurement of real or elapsed time, preprocessing and formating the data and then providing a tape or a hard copy of the results.

For purposes of explanation, consider the use of the invention in the telecommunication industry where it has been quite common to provide at a telephone central office traffic monitoring equipment. This equipment usually consists of traffic registers and counters (peg count meters, etc.) providing facilities for obtaining information about all call busy attempts, group busy, partial digits, traffic usage, position disconnect and answering time registration as well as other miscellaneous data on the various circuits in the office. This equipment is usually mounted in relay racks because of its bulk and size and provides individual line indications relative to an associated circuit. Usually no recordings of the figures on the various meters and counters are included, however, occasionally facilities for photographing the information are provided. More contemporary telecommunications systems are equipped with devices known as traffic usage recorders to provide traffic data by means of a switch count. Circuit terminals are scanned at predetermined intervals and those found busy are recorded on registers for the various circuit groups with busy conditions accumulated at the end of an hour or other predetermined period to indicate traffic load that was carried.

Telephone customers are served by a variety of types of central offices, that is, step-by-step, cross bar, electronic, etc., and it is impractical to provide a dedicated path for every originating equipment line, through the switching machine, to every possible termination (or telephone number) served by a particular central office. Realizing the impracticality of a dedicated path for every originating line, most central offices are designed to bring customers into the office in line groups, whereby a group of approximately 200 customers are served by 20 or less originating switches operating on "paths" or "links" to switch calls to the office. The number of customers that can be served by this form of concentration is a function of the number of calls placed by the 200 customers and the "holding time", or length of a call. In the telephone industry, "calling rate and holding time per call" is translated into "hundred call seconds (CCS) usage" or the usage stated in hundreds of call seconds. Since calling habits vary widely between customers, and the times of their calling varies by the hours in each day, it is very desirable to effect a "balance" within each group and between line groups to obtain an even flow of calls throughout the office throughout the day. The utopian situation would be to have the same number of calls handled by each line group for every 24 hour period. This would permit serving the maximum number of customers with the minimum capital expenditure for switching equipment.

In actual practice, telephone service customers are assigned to line groups by types of services that is, coin telephone, individual lines, two party lines, four party lines, business, and other types of telephone service. Traffic engineers in the telephone industry have established tables based on theories that are used to state the maximum number of CCS usage that can be assigned to a group of lines. These theories assume a CCS usage value for each of the types of telephone service provided. Lines are then assigned so that a line group is filled up to the CCS usage capacity for a particular central office. Theoretically, these maximums are based on the busy hour of the busy day of a busy season. This theoretical approach to offic loading and balancing works well when labor and equipment are relatively inexpensive, office loads are not exceptionally heavy and the calling rates are low. With new communications services now being offered such as WATS, data transmission, computer access lines, teletype services, in addition to others, the old "average" calling rate and holding times are fast becoming obsolete. The telephone industry spends many man hours, dollars and material attempting to "balance" calling loads through the various switching machines.

SUMMARY OF THE INVENTION

With the present state of art of recordng systems as previously outlined, there is no practical economical way to determine the actual calling rate and holding time of each individual line in a line group. Assuming this is possible, there is still no way to correlate the number of calls and the elapsed time per call with the actual time of day the calls are made. A feature of the present invention is to provide a data recording system that translates the electrical state of a device into a recording of a measurement of real or elapsed time. Further, a feature of the present invention is to provide a data recording system wherein the electrical state of a device connected to an individuaL terminal is translated into a recording of events. Still another feature of the present invention is to provide a data recording system for preprocessing and formating data related to the electrical state of a device connected to a terminal and provide a tape or a hard copy of the results.

Again specifically referring to the telecommunications industry, the data recording system of the present invention provides data identifying the line number of an individual customer connected to the system and shows the total number of calls on the individual line. This is the total number of calls both incoming and outgoing. In addition, the system provides data for the total number of incoming calls received by an individual customer and also the total number of outgoing calls made by the customer. Additional data provided by the system of the present invention details the number of times a customer waited more than three seconds to receive a dial tone when attempting to place an outgoing call. Also provided is data indicating the total time consumed on incoming calls for each individual line and the total time consumed on originating, or outgoing calls by each line number. These two total time measurements are given in tenths of a second to conform to standard CCS usage studies. In addition, the data recording system of the present invention provides a record of the total number of seconds that an individual customer waited for a dial tone during a particular period under study. The above information is of great value in load balancing and line administration.

Another important feature of the present invention is the flexibility of the data recordng system. For example, in the telecommunications industry the present invention can be adapted to provide data on calls to service code trunks, such as information calls, repair service calls, and other type service calls. This information is most beneficial for making a charge for placing a call for directory assistance. Data provided by the system of the present invention permits billing customers on a per call or CCS usage basis. Further, alarms can be implemented or printouts made of customers who tie up equipment by leaving an open receiver. In the area of equipment maintenance, the system can be programmed to alarm when a particular switch in a line group fails to operate in sequence.

It should be understood, however, that the data recording system of the present invention is equally useful in other industries requiring counting and timing of events, that is, valve openings and closings, electrical switching operation, night watchmen check-in stations and reports from specific stations in an industrial complex.

In accordance with the present invention, a system for scanning a plurality of wiring terminals, each having a identifying address, to detect changes in the electrical state at each of the terminals includes a central controller for sequentially generating, at intervals, the identifying address data of the wiring terminals to establish a scanning order. The identifying address data is decoded into gate control voltages that are individually applied to one of a plurality of scanner gates. The number of scanner gates is equal in number to the plurality of wiring terminals, with the gates connected to the wiring terminals on a one-to-one basis and responsive into a conducting mode by a predetermined gate control voltage. A detector responds to the electrical state on a wiring terminal connected to a scanner gate in a conducting mode to generate the terminal status signal.

BRIEF DESCRIPTION OF THE DRAWINGS

A more complete understanding of the invention and its advantages will be apparent from the specification and claims and from the accompanying drawings illustrative of the invention.

Referring to the drawings.

DESCRIPTION OF THE PREFERRED EMBODIMENT

Figure 1:
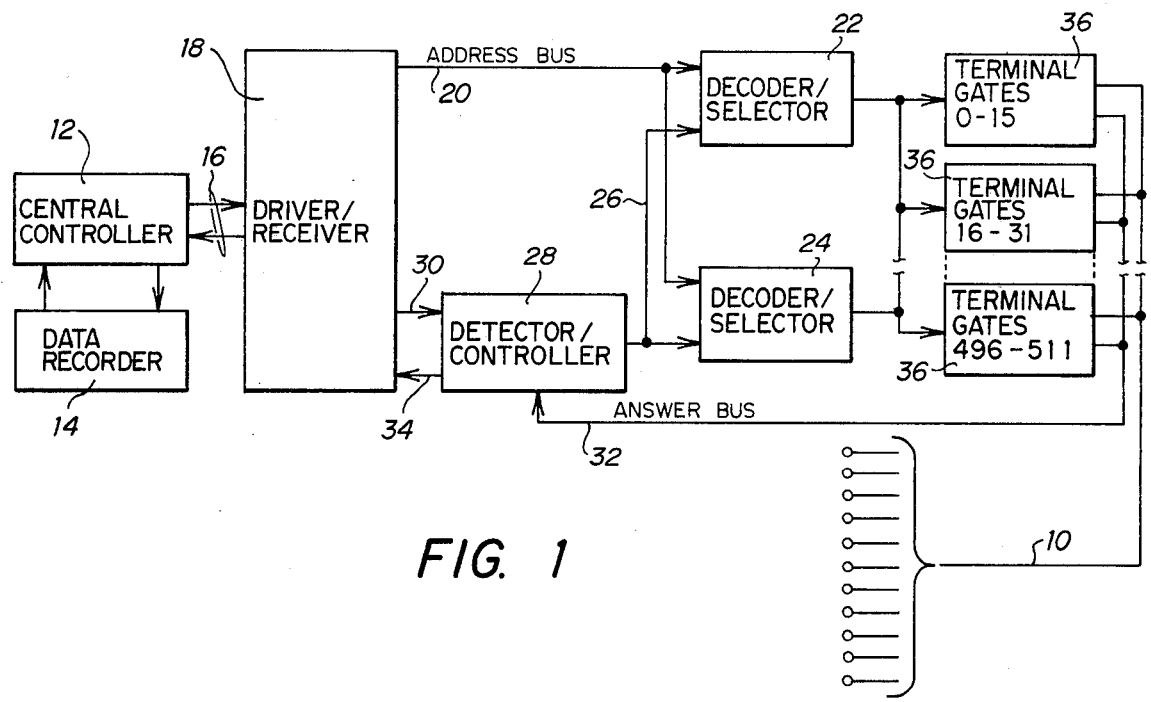
FIG. 1 is a block diagram of a data recording system of the present invention for scanning the electrical state on 512 terminals.

Referring to the drawings, FIG. 1 is a block diagram of a data recording system in accordance with the present invention for monitoring the electrical state of 512 terminals connected by means of cables 10 to terminal gates. The entire scanning system is under control of a central controller 12 having a data recorder 14 coupled thereto. The data recorder 14 may be a conventional teletypewriter with the capability of inputing instructions to the controller 12 and printing out data when performing as an ordinary typewriter by receiving character data from the controller 12. Typically, the controller 12 may be a minicomputer of the type marketed under the trade designation Microdata 400/10 Computer.

Coupled to the controller 12 by means of a cable 16 is a driver/receiver 18 that provides the proper electrical and mechanical interface from the controller 12 to the terminals connected to the cable 10. Terminal address information transferred from the controller 12 through the driver/receiver 18 is transmitted over an address bus 20 to decoder/selectors 22 and 24. The purpose of these circuits is to take the basic address information on the bus 20 and actuate terminal gates associated with a specific terminal or terminal group.

The decoder/selectors 22 and 24 are enabled by a control signal on a line 26 from the output of a detector/controller 28. The detector/controller 28 receives instructions from the controller 12 through the driver/receiver 18 over a line 30 and transfers terminal status information from an answer bus 32 to the controller 12 through the receiver 18 over a line 34.

Address information received by the decoder/selectors 22 and 24 is decoded to generate an energizing voltage to one or more terminal gates contained on the circuit cards 36. As illustrated in FIG. 1, each of the blocks identified with a reference numeral 36 contains sixteen terminal gates that when closed transmit the electrical state of the terminals connected to the cable 10 to the detector/controller 28 over the answer bus 32. By appropriate bias voltages and design of the terminal gates 36, the electrical state of each terminal connected to the calbe 10 above or below a specified reference voltage will be indicated on the answer bus 32 by a logic voltage level. The terminal gates may be designed to detect voltages on the terminals above or below a specific threshold, as desired. Thus, the system is not limited to responding to only an on/off condition at the terminals, but will respond to detect various electrical states.

When monitoring the electrical state of 512 terminals the system requires 512 terminal gates, typically arranged in circuits of sixteen thereby requiring thirty-two circuit cards 36. The gates are unidirectional and function as the input circuit to the system from the terminals being scanned.

By means of the terminal gates changes in the levels of voltage or current on the scanned terminals are translated into useful data (represented by logic voltage levels) by coupling the data on the answer bus 32 to the controller 12 which activates the data recorder 14 to provide hard copy readouts in any desired format.

When applied to the telecommunications industry, the voltage levels across a customer's line are detected to monitor the line usage. Depending on the type of usage, that is, incoming or outgoing, and also the progress of the call, the various terminals associated with a parituclar line have different voltages. These voltage differences are used to detect the various events that occur for each part of each type of call thereby making it possible by periodically scanning the terminals of a customer's line to record events taking place on the line.

Figure 2:
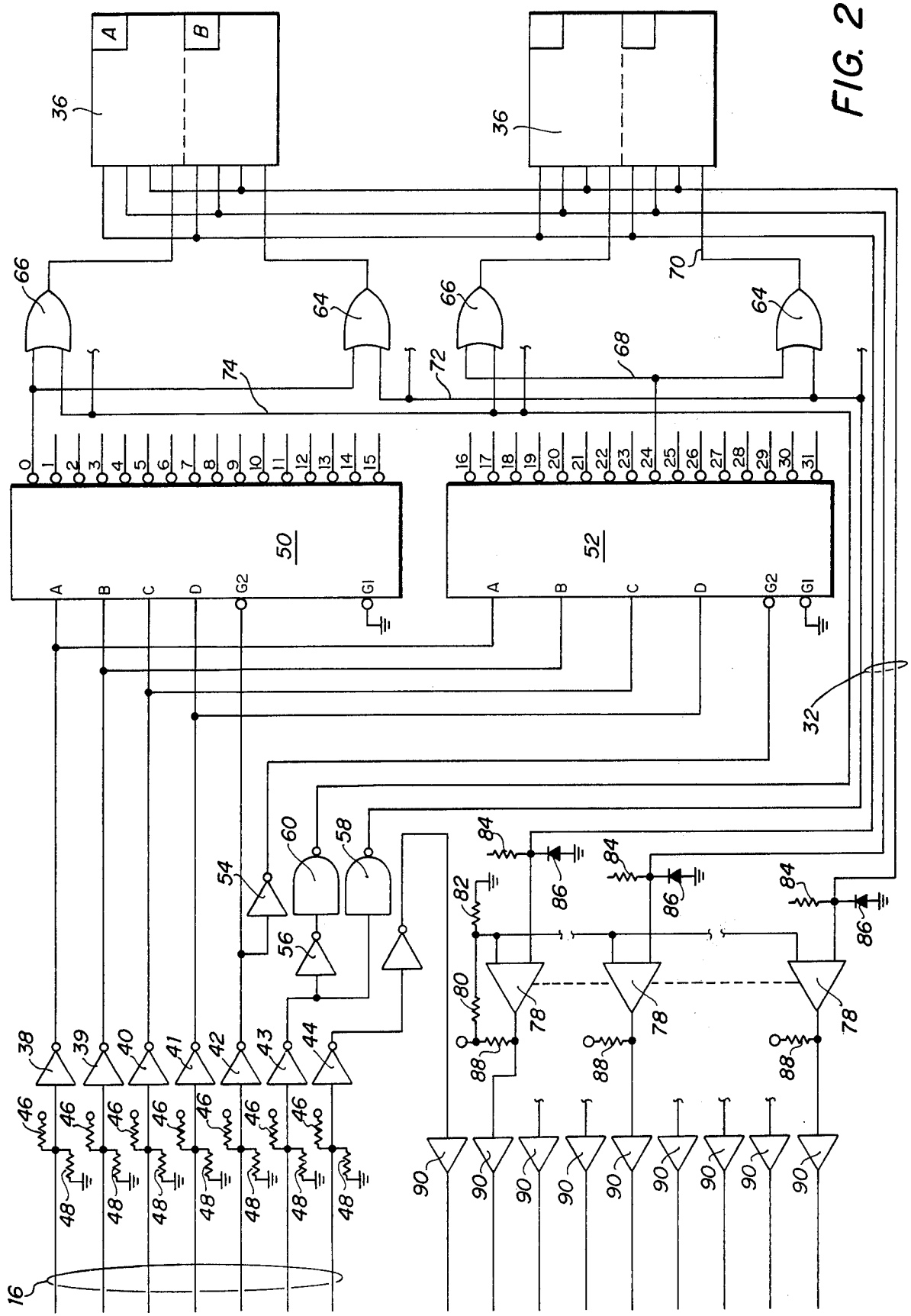
FIG. 2 is a functional schematic of the system of FIG. 1 detailing the decoding logic for sequentially scanning the 512 terminals in groups of eight.

Referring to FIG. 2, there is shown a functional schematic of the block diagram of FIG. 1 where address information from the controller 12 is received on a cable 16. To address one or more of the terminals connected to the cable 10, the controller 12 outputs an address of six data bits, with each data bit individually connected to one of the inverters 38–43 through resistor networks. An inverter 44 provides a common address channel from the controller 12. Each of the resistor networks is identical and comprises a resistor 46 connected to a voltage source in series with a resistor 48 connected to ground. The inverters 38–43 with the associated resistor network are collectively part of a driver/receiver 18.

Assume that the terminals connected to the cable 10 are to be interrogated in groups of eight, of the six data bit address provided by the controller 12, the first four bits are decoded to identify one terminal gate group of sixteen, that is, one of the circuit cards 36. The fifth bit identifies a selector group associated with either the decoder/selector 22 or the decoder/selector 24. The last bit enables eight of the terminal gates of each group of 16 terminal gates on one of the circuit cards 36, that is, the "A" or "B" half.

The first four address data bits appear at the output terminals of the inverters 38–41, respectively, and are applied directly to terminals of group selector registers 50 and 52. The group selector registers 50 and 52 comprise, respectively, parts of the decoder/selectors 22 and 24. The address bit input to the inverter 42 is also directly coupled to the group selector register 50. This bit also is input to an inverter 54 having an output connected to the group selector register 52.

The sixth address bit applied to the inverter 43 is coupled to the input of an inverter 56 and a NAND gate 58. The output of the inverter 56 is connected to a NAND gate 60. The NAND gate 58 and 60 enable either the terminal gates of group A or the terminal gates of group B on one of the circuit cards 36.

The output of the NAND gate 58 is connected to control gates 64 as representative of gates for controlling the terminal gates of group B for each circuit card 36. The NAND gate 60 has an output connected to one input of control gates 66 as representative of gates for controlling the terminal gates of group A for each of the circuit cards 36. That is, there is one control gate 64 and one control gate 66 for each of the circuit cards 36 for a total of thirty-two control gates 64 and thirty-two control gates 66. Only the control gates 64 and 66 for two of the circuit cards 36 have been illustrated in FIG. 2 to simplify the drawings.

Each of the control gates 64 and 66 for one of the circuit cards 36 connects to one output terminal of either the group selector register 50 or the group selector register 52. For a system utilizing 32 circuit cards 36 the first sixteen of such circuit cards are connected to output terminals of the selector register 50 and the circuit cards 16–31 are identified with the selector register 52.

To decode address information generated by the controller 12, the first five bits are applied to the group selector registers 50 and 52 to set one of these registers to provide a terminal gate voltage on one of the 32 output terminals. As an example, assume that the group selector register 52 provides a terminal gate voltage on the line 68 connected to one input terminal of control gates 64 and 66 for a selected circuit card 36. The next code bit, as inverted by the inverter 43, provides a control pulse at the output of either the NAND gate 58 or the NAND gate 60. For the example previously considered, if the NAND gate 58 provides the control pulse, the control gate 64 connected to the line 68 is enabled to supply on a control line 70 the terminal gate voltage to the terminal gates of group B of the circuit card. This control pulse enables the terminal gates in the selected group to respond to the electrical state of the group of eight terminals connected to the cable 10. The group B terminal gates associated with the twenty-fourth terminal of the group selector register 52 are connected to the terminals No. 392–399 which are interrogated by providing a control voltage on the line 70.

Figure 3:
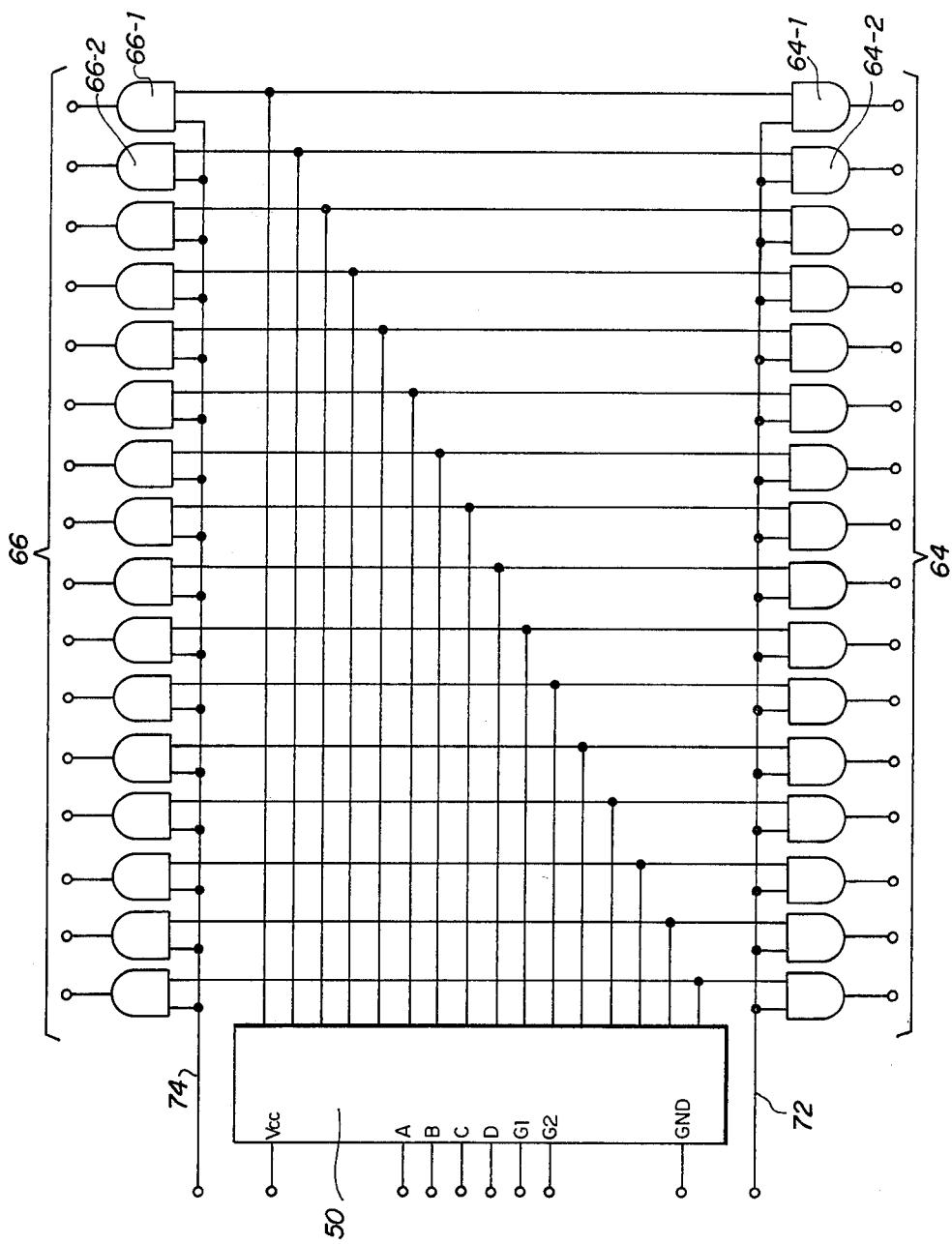
FIG. 3 is a logic diagram of a decoder/selector for generating gate control voltages from address information.

Referring to FIG. 3, the group selector register 50 is shown coupled to a complete array of control gates for scanning terminals identified with 16 of the 32 circuit cards 36. Terminals A, B, C, D, G1 and G2 are connected as shown in FIG. 2 to set the register to provide a terminal gate voltage on one of the 16 output terminals. Each of the 16 output terminals is connected to one control gate 64 and one control gate 66. The first terminal of the register 50 connects to one input of gate 64-1 and one input of gate 66-1. The second terminal of the selector register 50 connects to the gates 64-2 and 66-2 and the remaining terminals of the register are similarly connected. The second input terminal of each of the control gates 64 is interconnected to a line 72 from the output of the NAND gate 58. For the control gates 66, the second input terminal is interconnected to a line 74 tied to the output terminal of NAND gate 60. The output terminal of each of the control gates 66 and the interconnected control gate 64 connects to one of the circuit cards 36 for controlling the sixteen terminal gates on each card groups of eight.

A circuit identical to that shown in FIG. 3 is provided for the second selector group wherein the group selector register 52 has 16 output terminals each connected to one terminal of a control gate 66 and one terminal of a control gate 64. Again, each of the interconnected control gates 66 and control gates 64 has an output terminal connected to one of the circuit cards 36 to control the 16 terminal gates in groups of eight.

Referring again to FIG. 2, closing a group of terminal gates within one of the circuit cards 36 connects selected terminals at the end of the cable 10 to the detector/controller 28. The electrical state on the selected terminals is converted to a logic level signal appearing on the cable 76. Only three of the eight lines of the cable 76 are shown in FIG. 2. It will be understood that when the terminals are selected in groups of eight, there will be eight lines from each A and B section of the circuit card 36.

The logic level signals on ach line of the answer bus 32 are connected to the noninverting input terminal of one of the gate comparator amplifiers 78 of the detector/controller 28. The inverting input terminal to all the comparator amplifier 78 is connected to a positive reference voltage through a resistance divider including resistors 80 and 82. Each noninverting input terminal of the comparator amplifiers 78 is also connected to a positive supply through a resistor 84 and coupled to ground through a diode 86.

Figure 4:
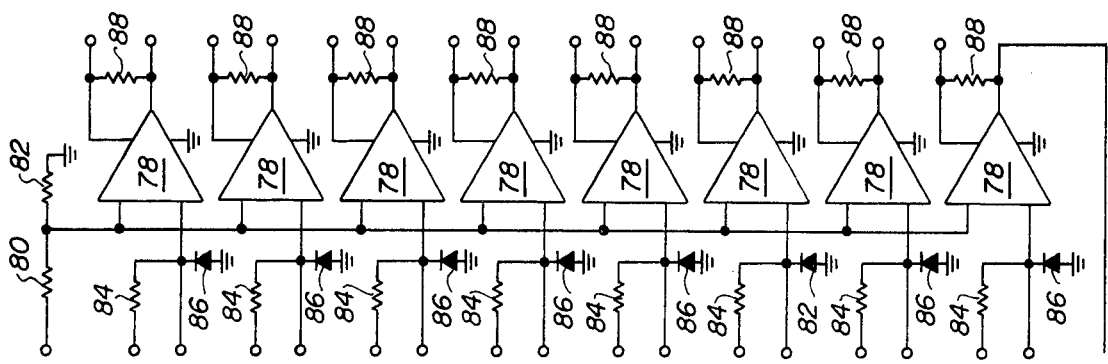
FIG. 4 is a schematic of the detector/controller of FIG. 1 for responding to the electrical states of up to eight terminals and generating logic level signals to a central contrller for further processing.

Referring to FIG. 4, there is shown a schematic of the complete array of gate comparator amplifiers 78 for processing electrical state signals for eight terminals simultaneously. Each of the amplifiers 78 of the array has a noninverting input terminal connected to one of the lines of the answer bus 32. The output terminal of each of the amplifiers 78 is interconnected through a resistor 88 to the positive reference supply connected to the resistor 88 and is individually connected to the inputs of one of eight buffer drivers 90 as part of the driver/receiver 18. These drivers do not invert the output of the amplifier 78, but provide proper impedance termination to couple to the controller 12.

Whenever one of the detector comparator amplifiers 78 does not receive a true response from one of the terminal gates, its output remains high and the interconnected driver 90 provides a logic high voltage on the cable 16 to the controller 12. A true response signal from the terminal gate causes a negative voltage to overcome the positive supply on the noninverting input terminal of the amplifier 78 and the amplifier switches to its second logic state. This results in a logic low voltage, or true signal, coupled through the identified driver 90 to the controller 12.

Figure 5:
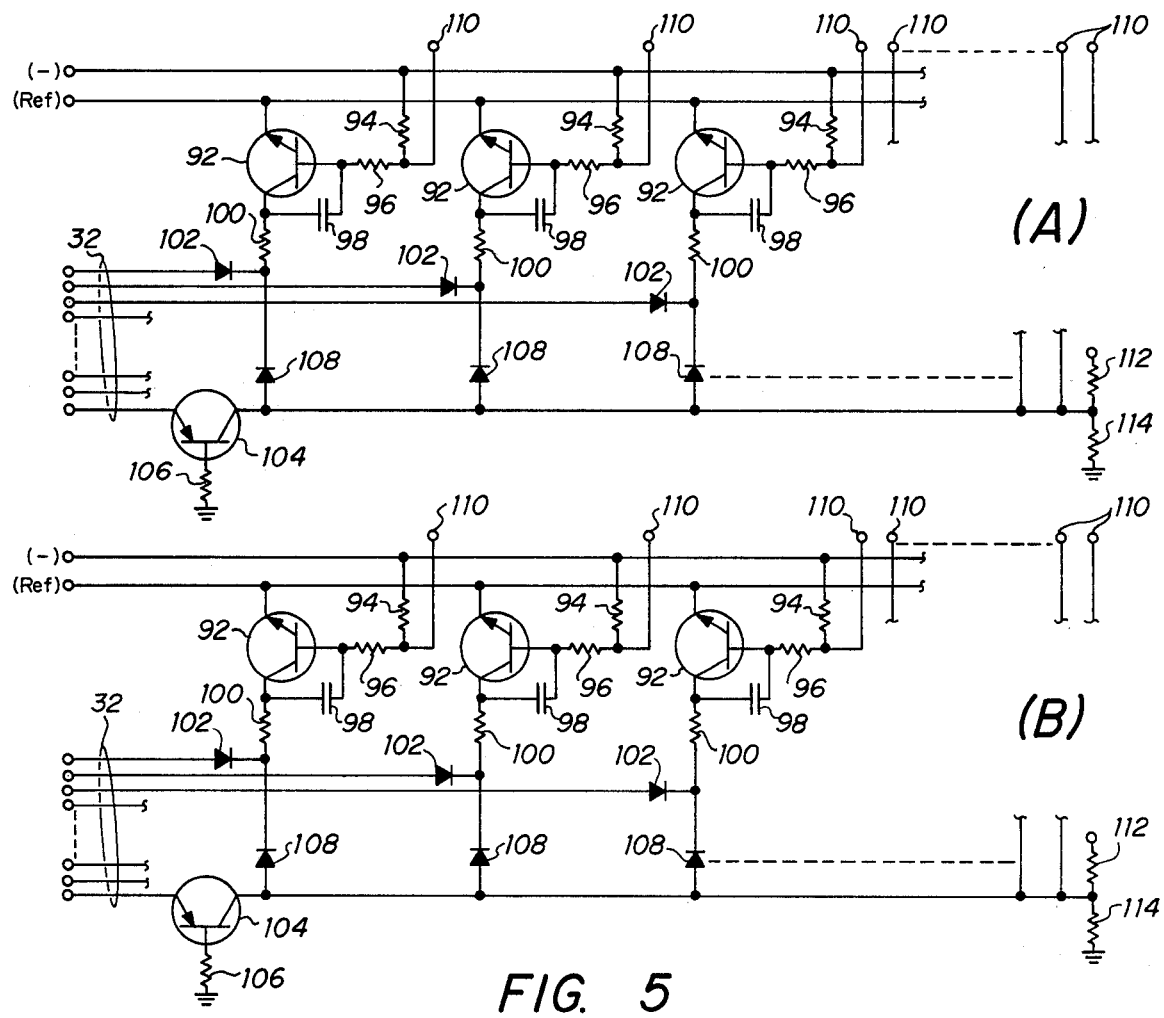
FIGS. 5A and 5B are schematics of one of thirty-two terminal gate circuit cards for sequentially scanning the 512 terminals in groups of eight.

Referring to FIG. 5, there is shown a schematic of one of the circuit cards 36 for simultaneously scanning eight of the terminals connected to the cable 10. Two identical circuits are provided in each of the circuit cards 36 and in FIG. 5 the circuits are identified as group A and group B. Each circuit consists of eight high impedance level detectors and one enable gate controlling all eight detectors. Each of the level detectors comprises a transistor 92 coupled to the negative terminal of a power supply through a divider network of resistors 94 and 96. The terminal to be scanned by each of the transistors 92 is interconnected by means of the cable 10 to points 110. An integrating capacitor 98 is coupled across the collector-base electrode junction for each of the transistors. The gated output for each detector is applied to one of the lines 76 (FIG. 2) through a resistor 100 and an isolating diode 102.

Although only three transistor detectors are shown for each of the terminal groups in FIG. 5, it will be understood that a circuit for a terminal group comprising eight terminals to be scanned includes eight transistors 92 with the associated circuitry including resistors 94 and 98, resistor 100 and isolating diode 102.

To simultaneously enable each of the detector transistors 92, a signal from the control gate 66 is applied to the emitter electrode of a transistor 104 (group A) having a base electrode connected to group through a resistor 106. The collector electrode of the transistor 104 is interconnected to each of the collector electrodes of the transistors 92 through a diode 108. For the circuit of group B, a signal from the control gate 64 is applied to the emitter electrode of the transistor 104 for that circuit group.

Each of the detector transistor 92 provides a two state output varying with the electrical state of the terminal connected to the point 110. If the electrical state of this terminal is above a reference voltage connected to the emitter electrode of the transistor 92, the transistor is held in an off condition because of a bit reverse bias on the base electrode through the resistor 96. With the transistor 92 in an off condition, no current flows through the resistor 100 and the scanned terminal is considered to be inactive.

If the electrical state of the terminal has a voltage level less than the reference applied to the emitter electrode of the transistor 92, then the transistor begins to turn on. As the transistor 92 begins to conduct a part of the voltage at the collector electrode is fed back to the base electrode, through the integrating capacitor 98 for the purpose of slowing down the turn on time thereby improving noise rejection. As the transistor 92 turns fully on, the junction of the capacitor 96 and the resistor 98 is approximately at the reference voltage and current flows through the resistor 100 and the isolating diode 102 and the scanned terminal are considered to be in an active state. Each of the detector transistors 92 operates as described to check the electrical state of the terminal connected to the point 110.

To activate each of the detector transistor 92 for transmitting the electrical state of the scanned terminal to the controller 12, the transistor 104 in conjunction with the diode 108 gates the transistor output to the detector/controller 28 over the answer bus 32 by means of the lines of the cable 76.

In operation of the transistor 104, in a quiescence state this transistor is forward biased by a voltage from the gate 66 for group A or gate 64 for group B through the resistor 106. The output of a voltage divider, composed of resistors 112 and 114 and the diodes 108, is clamped to the voltage at the emitter electrode of the transistor 104. Any of the detector transistors 92 that are conducting produces a current through the resistor 100; however, no current flow through the diode 102 since the junction of the resistor 100 and the diode 102 is clamped to the voltage at the emitter electrode of the transistor 104 through the diode 108.

To gate the detector transistor 92 to their respective lines of the cable 76, the transistor 104 is turned off and all the diodes 108 are reverse biased by a negative voltage from the divider of resistors 112 and 114. A current flowing through any of the resistors 100 will forward bias the diode 102 and the electrical state of the terminal at the point 110 will be coupled to the detector controller 28. Thus, the detector transistors 92 are in an "on" or "off" condition as determined by the electrical state of the terminal connected to the point 110.

Interrogating a detector transistor by turning off the transistor 104 does not affect its "on" or "off" condition and hence does not affect any terminal connected to the points 110. This provides effective isolation between external circuitry and the data recorder system of the present invention.

In operation of the system of the present invention, the controller 12 sequentially generates address information for each of the terminals connected to the cable 10. This address information is routed over the address bus 20 to the decoder/selectors 22 and 24 and also to the detector/controller 28. One of the decoder/selectors 22 or 24 is enabled by a particular address to change the logic state of the output at the control gates 64 and 66 for a particular terminal of the group selector registers 50 or 52. Either the control gate 64 or 66 is then enabled by the data bit from the inverter 43.

Depending on the gate 64 or 66 that is enabled, the transistor 104 for either group A or group B of one of the circuit cards 36 turns off and any of the detector transistors 92 that are conducting provides a current through the respective diode 102 to the associated line of the cable 76. This current is gated from the detector transistor 92 to the comparator amplifiers 78 of the detector/controller 28 to provide an "active" or "inactive" logic output signal to one of the driver gates 90 as part of the driver/receiver 18. The "active" or "inactive" states of each of the terminals connected to the detector transistors 92 when a transistor 104 is turned off will be processed to the controller 12 wherein character data is generated to activate the data recorder 14 to provide a hard copy of the status of each of the terminals connected to the cable 10.

The sequential generation of address information by the controller 12 continues such that each terminal is scanned periodically, typically one scan for each one-tenth of a second. By periodically scanning the terminals the "active" or "inactive" status information provided to the controller 12 also enables the generation of time related data. That is, the length of time a particular terminal was either in the "active" or "inactive" state may be calculated by monitoring the length of time the circuit was in one of its respective states.

Although the data recording system of the present invention was described with emphasis on a telecommunications application, it will be understood that the system is also applicable to other industries.

While only one embodiment of the invention, together with modifications thereof, has been described in detail herein and shown in the accompanying drawings, it will be evident that various further modifications are possible without departing from the scope of the invention.

What is claimed is:

1. A condition monitoring system for scanning terminal voltage levels on a plurality of terminals each having an identifying address to detect changes in the voltage level at each of the terminals, comprising in combination:
   a central controller for repetitively generating group identifying address codes in a prearranged order of the terminals to establish a group scanning order and including means for generating a control pulse,
   a plurality of means for decoding the group identifying address codes, each of said means for decoding responsive to one group identifying address code and generating a gate control voltage,
   a plurality of scanner gates at least equal in number to the plurality of terminals, said gates connected to the terminals and enabled by a gate control voltage and responsive into a conduction mode by a terminal voltage level above a reference voltage,
   means responsive to the control pulse to apply a gate control voltage to selected scanner gates to enable said gates to respond to a terminal voltage above a reference voltage, and
   detector means responsive to the voltage level on the terminals connected to the scanner gates in the conduction mode to generate a terminal status signal for each such terminal.

2. A condition monitoring system for scanning terminal voltage levels on a plurality of terminals as set forth in claim 1 wherein each of said scanner gates includes means for converting the voltage level of a gate in the conduction mode into an "active" or "inactive" logic state signal.

3. A condition monitoring system for scanning terminal voltage levels on a plurality of terminals as set forth in claim 2 including means for strobing said means for decoding to periodically provide the gate control voltages.

4. A condition monitoring system for scanning terminal voltage levels on a plurality of terminals as set forth in claim 1 wherein the plurality of terminals are identified with one of two primary groups, and said means for decoding includes means responsive to a group identifying address to generate the gate control voltage for one of the two groups.

5. A condition monitoring system for scanning terminal voltage levels on a plurality of terminals as set forth in claim 4 wherein said means responsive to the control pulse includes a plurality of logic gates each responsive to a control pulse to transfer a gate control voltage to a scanner gate.

6. A condition monitoring system for scanning terminal voltage levels on a plurality of terminals to detect changes in the voltage level at each of the terminals, comprising in combination:
   a central controller for repetitively generating at intervals the identifying address of the terminals to establish a scanning order,
   the identifying address is made up of a bit pattern having terminal group identifying bits, selector group identifying bits and a terminal identifying bit,
   a group/selector decoder responsive to the terminal group identifying bits and the selector group identifying bits and providing an intermediate gate control voltage,
   a plurality of control gates responsive to the intermediate gate control voltage and the terminal identifying bit to generate gate control voltages identifying a terminal,
   a plurality of scanner switches at least equal in number to the plurality of terminals, said switches connected to the terminals on a one-to-one basis,
   means connecting a reference voltage to each of said switches for biasing the conducting mode of each switch above the reference voltage applied thereto,
   means responsive to the gate control voltages for enabling at least one of said scanner switches to be switched into a conducting mode,
   means connected to each of said switches for applying a terminal voltage thereto as a switching voltage to cause an enabled switch to change to the conducting mode in response to a switching voltage above an applied reference voltage, and
   detector means responsive to the voltage level at each of the closed switches to generate a terminal status signal.

7. A condition monitoring system for scanning terminal voltage levels on a plurality of terminals as set forth in claim 6 including means for converting the voltage level of a connected terminal into an "active" or "inactive" logic state signal.

8. A condition monitoring system for scanning terminal voltage levels on a plurality of terminals as set forth in claim 6 wherein said central controller generates an identifying address for a prearranged group of the terminals and each control gate generates a gate control voltage for actuating the scanner gates identified with the selected groups of terminals.

9. A condition monitoring system for scanning terminal voltage levels on a plurality of terminals as set forth in claim 6 including means for decoding the identifying address into one of two primary terminal groups to generate a first primary selector group of identifying bits or a second primary selector group of identifying bits.

10. A condition monitoring system for scanning terminal voltage levels on a plurality of terminals as set forth in claim 9 wherein said group selector/decoder includes a first selector/decoder responsive to the first primary terminal group of identifying bits to generate a first intermediate gate control voltage and a second selector/decoder responsive to the second primary terminal group identifying bits to generate a second intermediate gate control voltage.

11. A condition monitoring system for scanning terminal voltage levels on a plurality of terminals as set forth in claim 10 wherein said scanner switches respond in prearranged groups to a preselected gate control voltage from one of said control gates.

12. A condition monitoring system for scanning a voltage level on a plurality of terminals each having an identifying address to detect changes in the voltage level of each of the terminals, comprising in combination:

a central controller for repetitively generating at intervals the identifying address of the terminals to establish a scanning order, means for decoding the generated identifying address of the terminals into gate control voltages, a plurality of scanner switches at least equal in number to the plurality of terminals, said switches connected to the terminals on a one-to-one basis, means connecting a reference voltage to each of said switches for biasing the conducting mode of each switch above the reference voltage applied thereto, means responsive to the gate control voltages for enabling at least one of said scanner switches to be switched into the conducting mode, means connected to each of said switches for applying a terminal voltage thereto as a switching voltage to cause an enabled switch to change into the conducting mode in response to a switching voltage above an applied reference voltage, and detector means responsive to a voltage level at each of the closed switches, and including means for generating a terminal status code from each voltage level.

13. A condition monitoring system for scanning terminal voltage levels on a plurality of terminals as set forth in claim 12 including means for recording the status of each terminal for each scan.

14. A condition monitoring system for scanning terminal voltage levels on a plurality of terminals as set forth in claim 13 wherein said means for recording includes means for marking the time of each terminal scan.

* * * * *